United States Patent [19]

Severn

[11] 4,204,454
[45] May 27, 1980

[54] INSTRUCTIONAL APPARATUS FOR STRINGED INSTRUMENT

[76] Inventor: Clare F. Severn, 11400 Liberty St., Clio, Mich. 48420

[21] Appl. No.: 943,785

[22] Filed: Sep. 20, 1978

[51] Int. Cl.² .................... G09B 15/06; G10D 3/00
[52] U.S. Cl. .................................. 84/315; 84/485 R
[58] Field of Search ........................... 84/315–318, 84/485

[56] References Cited

U.S. PATENT DOCUMENTS

| 10,213 | 11/1853 | Robertson | 84/315 |
| 511,009 | 12/1893 | Böcker | 84/315 |
| 2,145,718 | 1/1939 | Finney | 84/317 |
| 3,191,480 | 6/1965 | Lowe | 84/318 |

FOREIGN PATENT DOCUMENTS 1395244  5/1975  United Kingdom ...................... 84/485

*Primary Examiner*—Lawrence R. Franklin

*Attorney, Agent, or Firm*—Gifford, VanOphem, Sheridan & Sprinkle

[57] ABSTRACT

The present invention provides a keyboard adapted to be secured over the neck of a stringed instrument. The keyboard comprises a platform which supports a plurality of depressible plungers or keys aligned in rows and positioned directly above the strings extending along the neck of the stringed instrument. At least four adjustable legs support the keyboard platform above the neck of the instrument and elastic means urge the legs into contact with the neck. An instruction card having a face surface with instruction indicia printed thereon and slots adapted to register with the rows of plungers is secured by a hinge to the keyboard platform. In a first hinge position, the face surface of the card abuts against the plaform at a position spaced apart from the rows of plungers. In a second hinge position, the face surface of the instruction card is exposed and the slots provided in the card register with the rows of plungers.

6 Claims, 7 Drawing Figures

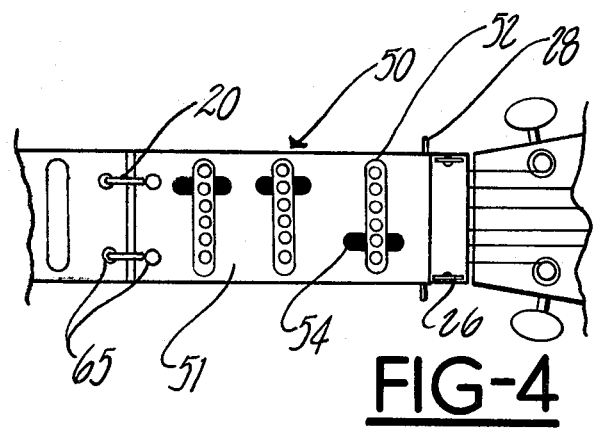
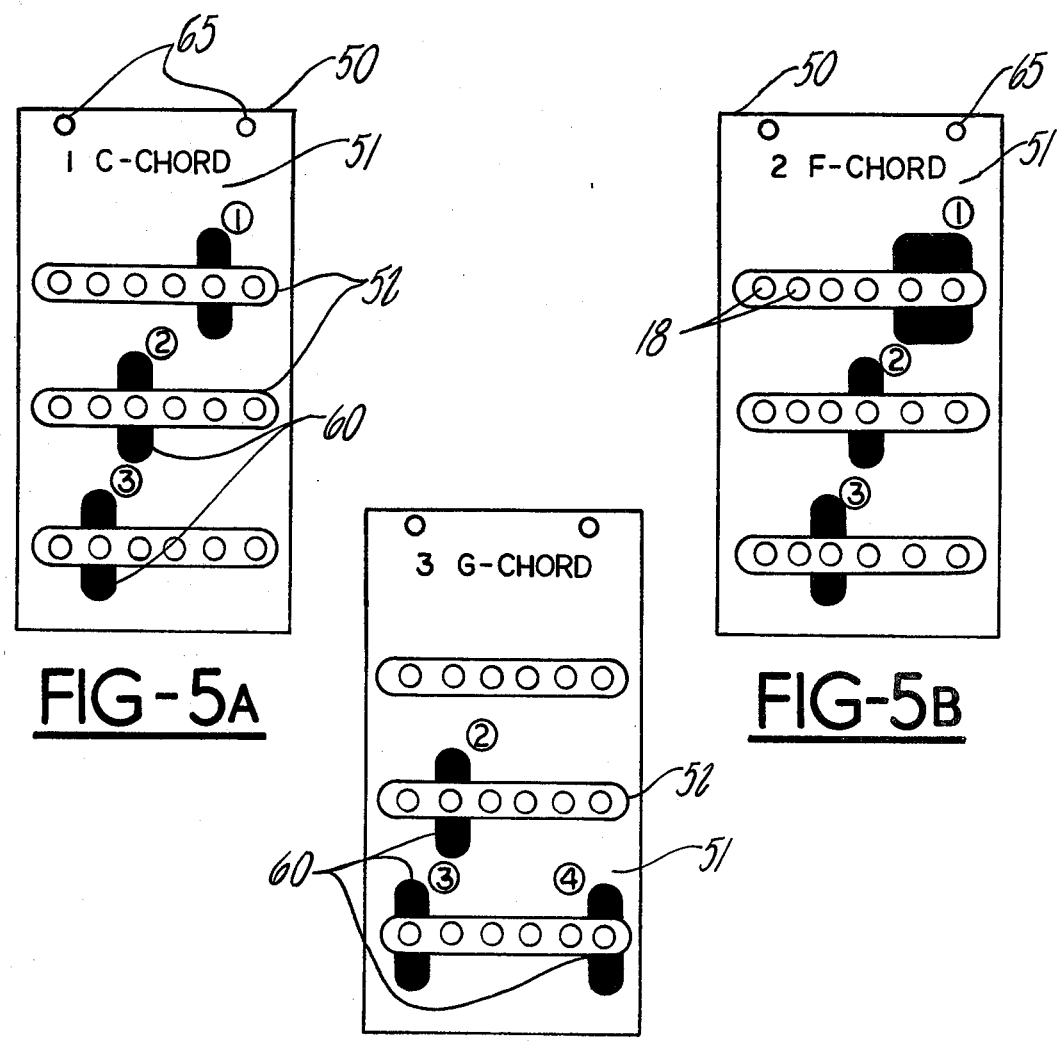

INSTRUCTIONAL APPARATUS FOR STRINGED INSTRUMENT

BACKGROUND OF THE INVENTION

Field of the Invention

The present invention relates generally to instructional aids for learning how to play a stringed instrument and more specifically, to such a device having plungers adapted to operatively engage strings extending along the neck of a stringed instrument.

It is often difficult for a student beginning to learn how to play a stringed instrument to correctly finger the strings extended along the neck of the instrument in order to produce harmonious chords. When the strings are incorrectly fingered, harsh dischords are produced which frustrate the student and discourage him from continuing to practice. Conversely, when the strings are correctly fingered, harmonious chords are produced which encourage the student to practice and offer an incentive for continuing to practice. Moreover, it is often advantageous for the student to learn a few basic chords at one time so that songs having simple chord arrangements can be played, thus enabling the student to fully perform popular or well-known songs. Thus, the student is constantly encouraged to continue practicing and learning more difficult arrangements.

SUMMARY OF THE PRESENT INVENTION

The present invention aids the beginning student by providing an indication of the correct fingering positions directly on the instrument itself. In addition, it further simplifies the correct fingering by providing keys or plungers which depress the strings when necessary without interfering with the tone of adjacent strings as is often the case with inaccurate finger placement by a beginning student. Thus, the correct finger positions are easily located and the chord is easily produced to thereby provide a harmonious sound. Thus, the student is encouraged to continue to practice and to learn a greater variety of chord changes and song arrangements.

The present invention generally comprises a substantially flat platform secured about the neck of the instrument by a set of adjustable legs. The platform is provided with a plurality of selectively engageable plunger assemblies positioned above each string and aligned in a row at a desired nodal point along the length of each string. Elastic means, such as a spring extending around the back of the neck of the instrument, engages the platform at each side and thereby urges the platform toward the top surface of the neck. A set of threaded legs engaged in threaded bores in the platform support the platform above the strings and enable the height of the platform above the strings to be adjusted. A hinge is secured to the top surface of the platform and is adapted to detachably secure at least one instruction card thereto. Thus, the instruction card can be rotated about the hinge on the surface of the platform and thus can be selectively positioned over the rows of plunger mechanisms. When the card is positioned over the rows of plunger mechanisms, slots provided in the card register with the rows and enable the plunger mechanisms to be operated by the student. Note indicia are printed on the face of the card to indicate the plunger mechanisms which must be depressed in order to produce a particular chord.

BRIEF DESCRIPTION OF THE DRAWINGS

The present invention will be more clearly understood with reference to the accompanying drawings wherein like reference characters refer to like parts in the several views and wherein:

FIG. 4 is a fragmentary top plan view similar to FIG. 1 but showing the instruction card in its second hinge position, and FIGS. 5a, 5b, and 5c are plan views of the face surfaces of several instruction cards.

DETAILED DESCRIPTION OF THE PRESENT INVENTION

Figure 1:
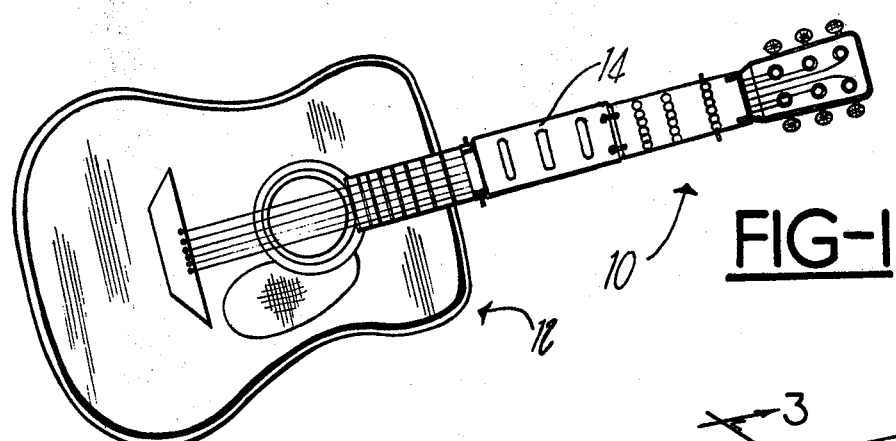
FIG. 1 is a top plan view of the device of the present invention shown mounted to the neck of a stringed instrument.
Figure 2:
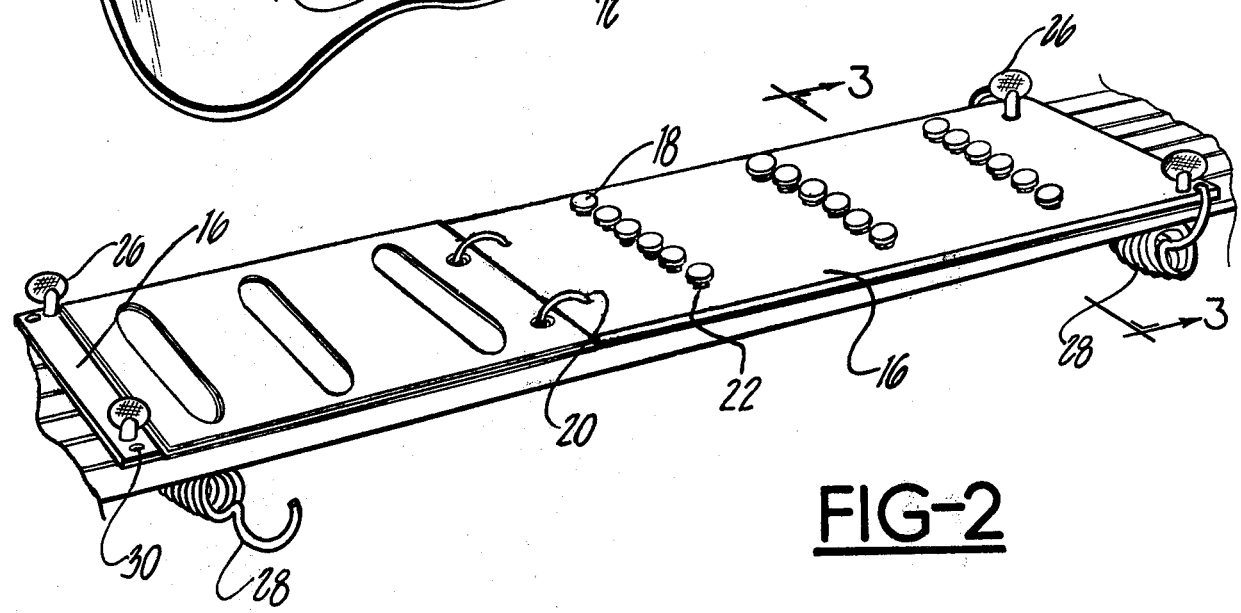
FIG. 2 is a perspective view of the apparatus of the present invention.

Referring now to FIG. 1, the present invention 10 is thereshown secured to an instrument 12 along its neck 14. Although as shown in FIG. 1, the apparatus of the present invention is secured to the neck of a guitar, it is to be understood that the invention is not so limited and can be utilized with any stringed instrument having a neck 14. As best shown in FIG. 2, the apparatus of the present invention comprises a platform 16 which supports a plurality of plunger mechanisms 18 and instruction card holding means 20.

The platform 16 is preferably a substantially flat and rigid rectangular sheet having substantially the same width as the width of the neck 14 and having a length substantially as long as the length of the neck 14. The platform 16 is provided with rows of throughbores 22 extending across the width of the platform and at least four threaded throughbores adapted to engage threaded mounting legs 26 preferably, one at each corner. The ends of the threaded legs 26 contact the surface of the neck 14 so that turning or rotation of the legs 26 within the bores 24 raises or lowers the height of the platform 16 above the surface of the neck 14. Elastic means such as a spring 28 is stretched around the back of the neck 14 and is engaged at each of its ends in an appropriate bore 30 provided in the platform 16 to thereby urge the platform 16 against the neck 14. Preferably, two such springs are provided in a spaced apart arrangement to secure the platform 16 to the neck 14. Although only two legs 26 are shown secured near each end of the platform 16, any desired number of support legs may be utilized along the length of the platform 16 to enable the platform 16 to be rigidly supported at a desired height throughout the length of the platform.

Figure 3:
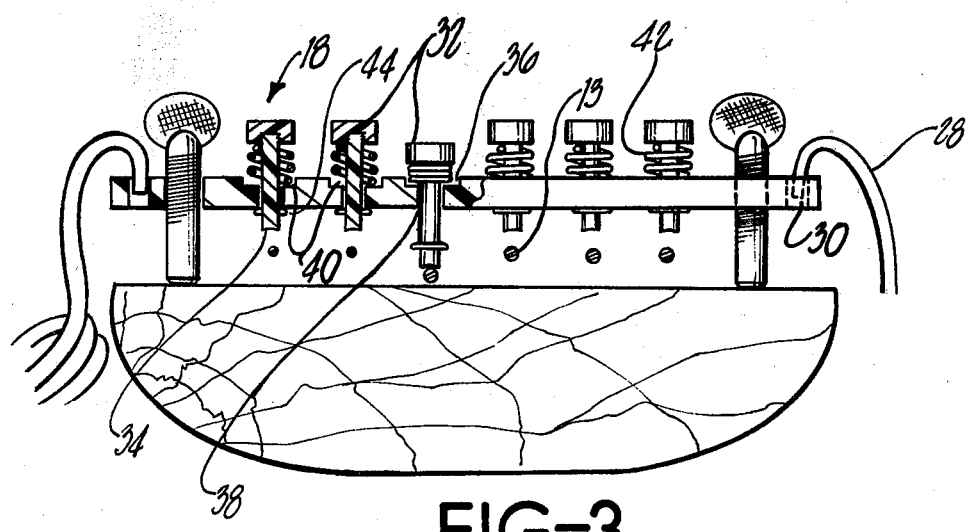
FIG. 3 is a fragmentary sectional view taken substantially along line 3—3 in FIG. 2.

A plunger mechanism 18 is provided for each bore 22 on the platform 16. Each plunger comprises a head portion 32 and a narrower stem portion 34. Preferably, each throughbore 22 is a recessed throughbore that has an upper portion 36 which is substantially the same diameter as the head portion 32 of the plunger 18. The lower portion 38 of the throughbore 22 is substantially the same diameter as the diameter of the stem portion 34 of the plunger 18. Thus, an annular surface 40 is provided between the upper portion 36 and the lower portion 38 of the throughbore 22. A spring 42 is positioned around the stem 34 between the annular surface 40 and the bottom surface of the head portion 32. Thus, the spring urges the button upward away from the neck 14 of the instrument. Each stem portion 34 is substantially longer than the length of the bore 22 so that it extends below the platform 16. A retainer ring 44 is secured around the stem near its lowermost extended portion in order to limit the displacement of the plunger 18 as it is urged upward by the spring 42. As normally positioned, the lower end of the stem 34 remains supported a slight distance above a string 13. However, as the head portion 32 of the plunger 18 is depressed downwards the stem 34 engages the string 13 and depresses it downwardly into engagement with the surface of the neck 14 as shown in FIG. 3.

The instruction card 50 is preferably a flat sheet of sturdy cardboard which has substantially the same width as the neck of the instrument 12. A series of slots 52 are provided through the card 50 and are adapted to register with the rows of plungers 18. Therefore, when the card is positioned over the keyboard portion of the platform 16 the plungers are still visible and accessible through the slots 52 in the card 50. Appropriate indicia 60 are provided on the face of the card to indicate the plungers 18 which must be depressed in order to produce a particular chord (see FIGS. 5a, 5b, and 5c).

Instruction card holding hinge means 20 comprises a substantially U-shaped ring, one end of which is secured to the platform, and the other end of which springingly abuts against the top surface of the platform 16. An instruction card 50 is slid under the unsecured ends of the rings until the rings register with a pair of apertures 65 at one end of the card 50. When the card 50 is in the position as shown in FIG. 2, the face 51 of the card 50 rests upon the top surface of the platform 16. When the card 50 is rotated about the hinge ring, toward the keyboard portion of the platform 16, the slots 52 in the card 50 register with the rows of plungers 18 as shown in FIG. 4. The face 51 of the card 50 is then exposed to the view of the student. Preferably, each card 50 is marked with appropriate indicia to indicate the correct finger positions for a single chord. The card holding means 20 is preferably adapted to hold a plurality of cards 50 so that a variety of chords and corresponding finger positions are easily accessible to the student.

Thus, the invention provides a novel device which aids the student in learning and correctly fingering basic chords on a stringed instrument. Each instruction card acts as a template on the keyboard to indicate correct finger placement for a corresponding chord.

Having thus described my invention, many modifications thereto will become apparent to those skilled in the pertinent art without departing from the scope and spirit of the invention as defined in the appended claims.

What is claimed is:

1. An apparatus to aid the beginning student in learning the correct finger positions required for producing basic chords on the neck of a stringed instrument comprising:
   a flat platform having a plurality of throughbores aligned in rows so that each throughbore in a row registers with a string across the neck of the instrument when the platform is placed over the neck, each row being aligned along the neck to register with predetermined nodal points along the strings of the instrument;
   means for mounting said platform to said instrument in position spaced above said neck,
   a plurality of plungers, each adapted to be received through one of said throughbores so that depression of said plunger engages and depresses the string registering with that one of said throughbores into contact with the neck;
   a card having a face surface and a plurality of slots therethrough which are adapted to register with said rows of throughbores;
   means for clamping said card to said platform; and
   instrucion indicia provided on said face surface of said card to indicate desired depressions of said plungers.

2. An apparatus to aid the beginning student in learning the correct finger positions required for producing basic chords on the neck of a stringed instrument comprising:
   a flat platform having at least four threaded bores therethrough and a plurality of throughbores aligned in rows so that each throughbore in a row registers with a string across the neck of the instrument when the platform is placed over the neck, each row being aligned along the neck to register with predetermined nodal points along the strings of the instrument;
   a plurality of plungers, each adapted to be received through one of said throughbores so that depression of said plunger engages and depresses the string registering with that one of said throughbores into contact with the neck;
   at least four threaded support legs adapted to be secured to said platform by engagement with said threaded bore to adjustably support said platform above the neck of the instrument;
   elastic means for urging said support legs against the neck;
   a card having a face surface and a plurality of slots therethrough which are adapted to register with said rows of throughbores;
   means for clamping said card to said platform; and
   instruction indicia provided on said face surface of said card to indicate desired depressions of said plungers.

3. The invention as defined in claim 2 wherein said last-mentioned means comprises a hinge secured intermediate the longitudinal ends of said platform and aligned so that said face surface of said card abuts against the platform in a first hinge position, and so that said face surface is exposed and said slots register with said rows of throughbores in a second hinge position.

4. The invention as defined in claim 2 wherein said elastic means comprises:
   a spring,
   a pair of opposite edge portions of said platform having a bore therein, and
   a hook secured to each end of said spring adapted to engage said bores.

5. The invention as defined in claim 2 wherein each of said plurality of plungers comprises:
   a head portion,
   a stem portion secured to said head portion and substantially longer than the depth of said throughbores so as to extend outwardly therefrom, and
   spring means for urging each plunger away from the string.

6. The invention as defined in claim 5 wherein each throughbore is a recessed throughbore having a first portion with a diameter substantially equal to the diameter of said head portion and a second portion having a diameter substantially equal to the diameter of said stem portion; and
   a locking ring secured around said stem portion at a point outwardly from said second portion of said throughbore to thereby limit the displacement provided by said spring means.

* * * * *